United States Patent [19]
Oka et al.

[11] 3,834,729
[45] Sept. 10, 1974

[54] SEALING UNIT FOR PRESSURIZED GAS GENERATOR OF AUTOMOTIVE SAFETY DEVICE

[75] Inventors: Takashi Oka, Tokyo; Tatsuhiro Arima, Yokohama City; Tugio Noda, Kawagoe City, all of Japan

[73] Assignee: Nissan Motor Company, Limited, Yokohama City, Japan

[22] Filed: Feb. 4, 1972

[21] Appl. No.: 223,502

[30] Foreign Application Priority Data
Sept. 23, 1971 Japan.............................. 46-86285
Sept. 23, 1971 Japan.............................. 46-86286

[52] U.S. Cl. ................. 280/150 AB, 137/68, 222/3
[51] Int. Cl. ............................................. B60r 21/08
[58] Field of Search .......... 280/150 AB; 137/68, 69; 222/3

[56] References Cited
UNITED STATES PATENTS

| | | | |
|---|---|---|---|
| 2,149,659 | 3/1939 | Bettis................................. | 137/68 |
| 2,370,870 | 3/1945 | McKeague........................ | 137/68 X |
| 2,736,459 | 2/1956 | Cockram et al............. | 280/150 AB |
| 2,972,998 | 2/1961 | Detwiler.............................. | 137/68 |
| 3,196,610 | 7/1965 | Anderson........................... | 137/68 |
| 3,564,845 | 2/1971 | Friedman, Jr. et al............. | 137/68 |
| 3,567,245 | 3/1971 | Ekstrom....................... | 280/150 AB |
| 3,630,214 | 12/1971 | Levering............................. | 137/68 |
| 3,642,304 | 2/1972 | Johnson et al. ............. | 280/150 AB |
| 3,653,684 | 4/1972 | Plumer.................................. | 222/5 |
| 3,680,886 | 8/1972 | Mazelsky....................... | 280/150 AB |
| 3,706,463 | 12/1972 | Lipkin ........................... | 280/150 AB |

*Primary Examiner*—David Schonberg
*Assistant Examiner*—John P. Silverstrim
*Attorney, Agent, or Firm*—Robert E. Burns; Emmanuel J. Lobato; Bruce L. Adams

[57] ABSTRACT

A sealing unit for use in a pressurized gas generator of an automotive safety device for protecting a vehicle occupant from injury during a collision of a motor vehicle. The sealing unit includes a spherical segment formed in a neck portion of the pressurized gas generator, a semi-spherical hollow member having an inner surface and an outer surface facing the spherical segment, an impact responsive explosive charge mounted in a concave portion of the semi-spherical hollow member, and a cap member threadably engaged with a leading end of the neck portion of the pressurized gas generator, the cap member having a bottom wall formed with a bore which is aligned with a pressurized gas discharge outlet of the pressurized gas generator and which communicates with an inflatable confinement of the safety device.

11 Claims, 3 Drawing Figures

SEALING UNIT FOR PRESSURIZED GAS GENERATOR OF AUTOMOTIVE SAFETY DEVICE

This invention relates in general to a safety device for a motor vehicle adapted for protecting a vehicle occupant from injury during a collision of the motor vehicle with an obstruction and, more particularly, to a sealing unit for use in a high pressurized gas generator of the safety device.

A known safety device usually includes an inflatable confinement or protector bag which is normally held in a collapsed or folded condition. The inflatable confinement is positioned between the vehicle occupant and the structural parts of the motor vehicle such as a windshield, an instrument panel and a steering wheel of the motor vehicle whereby when the confinement is inflated to its protective position as a result of impact or collision of the motor vehicle, the vehicle occupant is prevented from contacting the structural parts of the motor vehicle.

The inflatable confinement is actuated to its expanded condition with a pressurized gas which is supplied from an appropriate pressurized gas generator. The pressurized gas generator is constructed in such a manner as to produce the pressurized gas when opened. This pressurized gas generator is provided with a suitable sealing means at its pressurized gas discharge outlet through which the pressurized gas is passed into the inflatable confinement. An explosive means has conventionally employed to rupture this sealing means for thereby permitting the pressurized gas produced in the pressurized gas generator to pass through a suitable duct to the inflatable confinement so that it is expanded to its protective position.

In order that the safety device operates reliably, it is desired, that the inflatable confinement be fully expanded and projected to its protective position in a shortest possible period of time, say, several tens of milliseconds after an initial collision condition has been encountered. To enable the inflatable confinement to be expanded as rapidly as possible, it is requisite that the sealing means of the pressurized gas generator be ruptured to provide a large opening for allowing the pressurized gas into the inflatable confinement in several tens of milliseconds during collision condition of the motor vehicle.

Attempts have been made to construct the sealing means by a fragile material so that the sealing means is instantaneously ruptured to provide an opening for admitting the pressurized gas into the inflatable confinement when the collision is encountered by the motor vehicle. However, the sealing means thus constructed is quite dangerous for the vehicle occupant since the sealing means is apt to be ruptured even when a slight shock is encountered by the motor vehicle during cruising.

To eliminate this drawback, it has been proposed to employ a material having a sufficient strength in the sealing means and to employ a large capacity of explosive charge to effect complete rupturing of such sealing means. This prior proposal is, however, disadvantageous in that such a large capacity of explosive charge is, when activated, accompanied by damages to the associated component parts and by loud detonation, sometimes inviting an injury to the occupant's eardrums.

It is, therefore, an object of this invention to provide an improved sealing unit for use in a pressurized gas generator of an automotive safety device, which sealing unit is destructible with the use of small capacity of explosive charge to enhance the safety of a vehicle occupant.

Another object of this invention is to provide an improved sealing unit for use in a pressurized gas generator of an automotive safety device, which sealing unit is instantaneously ruptured in response to a collision condition of a motor vehicle whereby the safety device operates reliably.

A still another object of this invention is to provide an improved sealing unit for use in a pressurized gas generator of an automotive safety device, which sealing unit is simple in construction and easy to manufacture and assemble.

A further object of this invention is to provide an improved sealing unit for use in a pressurized gas generator of an automotive safety device, which sealing unit is suited for a large-sized production on a commercial basis and accordingly for curtailing the production cost of the safety device.

In general, these and other objects and features of the present invention are achieved in a sealing unit specifically designed for use in a pressurized gas generator of an automotive safety device. The sealing unit consists of a spherical segment formed in a neck portion of the pressurized gas generator, a dome-shaped or semi-spherical hollow blocking member having an inner surface and an outer surface facing the spherical segment, and an impact-responsive explosive charge mounted in the inner surface of the semi-spherical hollow member. The semi-spherical hollow member is retained by a cap member which is threadably engaged with a leading end of the neck portion of the pressurized gas generator. The cap member has a bottom wall provided with a bore which is aligned with a pressurized gas discharge outlet of the pressurized gas generator, the bore communicating with an inflatable confinement of the safety device so that when the sealing unit is ruptured to open the pressurized gas generator, the pressurized gas is admitted into the inflatable confinement to actuate the same to its protective position. The sealing unit may also consists of a packing means which is interposed between the semi-spherical segment formed on the neck portion of the pressurized gas generator and the outer surface of the semi-spherical hollow member. In one preferred embodiment, the packing means is composed of an O-ring which is disposed in an annular recess formed in the semi-spherical segment. In another preferred embodiment, the packing means is composed of a soldered metal sheet which is shaped in semi-spherical form to match the outer surface of the semi-spherical hollow member. The sealing unit may further consists of an explosion energy transmitting means which is charged in a concave portion of the semi-spherical hollow member. The explosion energy transmitting means is retained by a hollow retainer having its outer periphery releasably disposed in the bore of the cap member.

These and other objects and advantages of this invention will become more apparent from the following description when taken in conjunction with the accompanying drawings in which same reference numerals are used to designate like component parts and in which.

Figure 1:
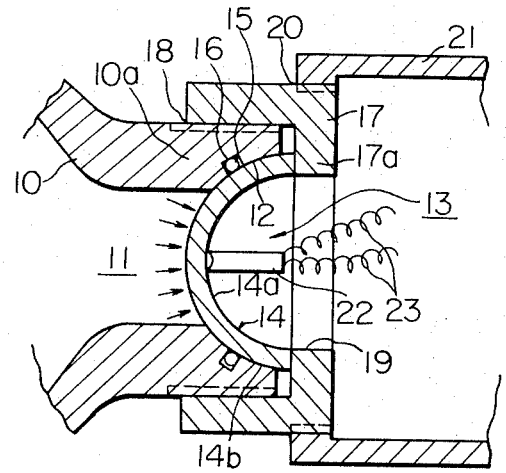
FIG. 1 is a sectional view of a preferred example of a sealing unit implementing the present invention, the sealing unit being shown as mounted on a pressurized gas discharge outlet of a pressurized gas generator of an automotive safety device.

Referring now to the drawings and more particularly to FIG. 1, there is schematically shown a sealing unit according to the present invention, the sealing unit being specifically suited for use in pressurized gas generator of a conventional automotive safety device. The pressurized gas generator, indicated at 10, may be of any suitable construction insofar as it functions to generate a high pressurized gas in response to a collision condition of a motor vehicle. The pressurized gas generator 10 has a neck portion 10a to form a pressurized gas discharge outlet 11 through which a high pressurized gas is passed into an inflatable confinement (not shown) of the safety device so that the inflatable confinement is expanded to its protective position. To hermetically seal off the pressurized gas discharge outlet 11, the neck portion 10a is formed with a spherical segment 12 at the leading end thereof to which the sealing unit of the present invention is attached in closing engagement.

The sealing unit, which is generally designated by reference numeral 13, consists of a semi-spherical hollow member 14 which has inner and outer surfaces 14a and 14b. The semi-spherical hollow member 14 may be made of any known fragile material such as a resin or a ceramics because the hollow member 14 is shaped in semi-spherical form to provide a sufficient strength. This hollow member 14 is placed on the spherical segment 12 formed on the neck portion 10a of the pressurized gas generator 10 in such a manner that the outer surface 14b of the hollow member 14 faces the spherical segment 12 whereby the pressurized gas in the pressurized gas generator 10 acts on the convex portion (not identified) of the hollow member 14 as show by an arrow in FIG. 1. This hollow member 14 is thus releasably in closing engagement with the spherical segment 12 formed at the leading end of the neck portion 10a. To provide a satisfactory sealing function, the sealing unit 13 may includes a packing means 15 which is disposed in an annular recess 15 formed in the spherical segment 12. In the embodiment of FIG. 1, the packing means 15 is shown as O-ring but may be of any suitable means as described hereinafter.

To retain the hollow member 14 in closing engagement with the spherical segment 12, an open-ended cap member 17 is provided which is threadably engaged with the neck portion 10a of the pressurized gas generator 10 at 18. As shown in FIG. 1, the open-ended cap member 17 has a bottom wall 17a formed with a bore 19 which is aligned with the pressurized gas discharge outlet 11. Threadably engaged with the outer periphery of the cap member 17 at 20 is a duct 21 which communicates with the inflatable confinement (not shown) of the safety device.

An impact-responsive explosive charge 22 is mounted in a concave portion of the hollow member 14 at the center thereof and is secured to the inner surface of the hollow member 14a in a suitable manner such as welding or fastener means. The impact-responsive explosive charge 22 has a pair of leads 23 connected to a known suitable triggering means or sensing means to sense the collision condition of the motor vehicle and is responsive to the impact encountered by the motor vehicle to rupture the semi-spherical hollow member 14.

With this arrangement, when the triggering means (not shown) is actuated in response to the collision of the motor vehicle, the explosive charge is activated to rupture the semi-spherical hollow member 14. Consequently, the hollow member 14 is released from the spherical segment 12 so that the bore 19 formed in the bottom wall 17a of the cap member 17 communicates with the pressurized gas discharge outlet 11 of the pressurized gas generator 10. Thus, the pressurized gas in the gas generator 10 is caused to rush through the duct 21 to the inflatable confinement (not shown) and, therefore, the same is actuated to its protective position so that the vehicle occupant is prevented from impacting against the structural parts of the motor vehicle.

It will be appreciated that the hollow member 14 is bearable against the high pressurized gas acting thereupon because the hollow member 14 is formed in semi-spherical shape and the convex portion or outer surface 14b of the hollow member 14 is arranged to be subjected to the pressurized gas in the pressurized gas generator 10. Since, moreover, the hollow member 14 is made of fragile material as discussed above, a small capacity of explosive charge can be employed to enhance the safety of the vehicle occupant.

Figure 2:
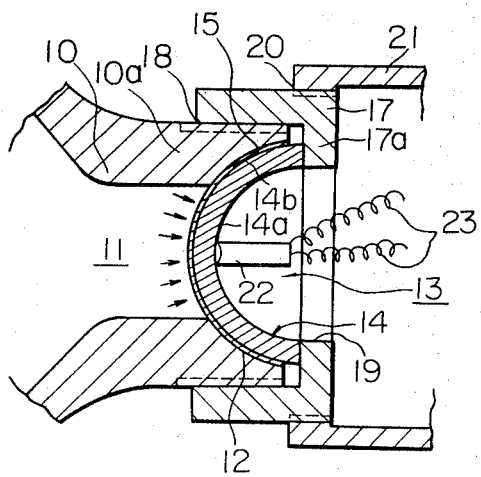
FIG. 2 is a view similar to FIG. 1 but shows a modified form of the sealing unit shown in FIG. 1.

FIG. 2 illustrates a modified form of the sealing unit according to the present invention. The sealing unit of FIG. 2 is similar to that of FIG. 1 in construction and operation with the except that the packing means 15 is constituted by a metal sheet and, therefore, the detailed description of the same is herein omitted for the sake of simplicity of illustration. In this modification, the soldered metal sheet 15 is shaped in semi-spherical form to match the outer surface 14b of the semi-spherical hollow member 14. The soldered metal sheet 15 thus shaped is disposed between the spherical segment 12 and the outer surface 14b of the semi-spherical hollow member 14 and brazed to the spherical segment 12 to provide a satisfactory packing function.

Figure 3:
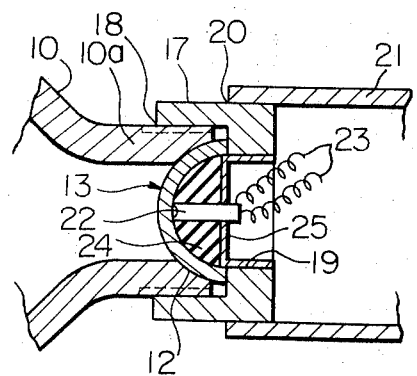
FIG. 3 is a view similar to FIGS. 1 and 2 but shows another modified form of the sealing unit according to the present invention.

Another modified form of the sealing unit is illustrated in FIG. 3. In this modification, the packing means 15 is removed from the sealing unit 13 and the sealing unit 13 is shown to further include an explosion energy transmitting means 24 which is charged in the concave portion (not identified) of the hollow member 14 around the explosive charge 22. This explosion energy transmitting means 24 is retained in the concave portion of the hollow member 14 by means of a hollow retainer 25 having outer periphery releasably disposed in the bore 19 of the cap member 17. The explosive energy transmitting means 24 may be made of any suitable medium such as geled material, a grease having high viscosity, a rubber including a silicon rubber having high elasticity or a rubber like material. The explosion energy transmitting means 24 thus charged in the concave portion of the hollow member 14 functions to uniformly transmit the energy caused by an explosion of the explosive charge 22 to an increased portion of the inner surface 14a of the hollow member 14 so that the hollow member 14 is completely ruptured by the explosion in the shortest period of time thereby providing increased gas flow and effecting an improved reliability in the operation of the safety device. The other constructions and arrangements of the sealing unit shown in FIG. 3 are the same with those of FIG. 1 and, therefore, the detailed description of the same will be herein omitted.

It will now be appreciated from the foregoing description that since the sealing unit embodying the present invention includes a semi-spherical hollow member which is readily rupturable yet possess a sufficient strength, a much smaller amount of an explosive charge may be utilized thus introducing a significant safety factor and, additionally, the pressurized gas generator is instantaneously opened to admit the pressurized gas into an inflatable confinement in a short period of time.

It will also be noted that the sealing unit according to the present invention permits the use of minimum number of component parts to provide a compact and simple construction and ease of assembling with a resultant decrease in manufacturing cost.

It will further be understood that the sealing unit of the present invention can be readily installed in various known safety devices of the type having a pressurized gas generator.

Although the present invention has been shown and described with reference to specific embodiments, materials and details, various modifications and changes, within the scope of this invention will be apparent to one skilled in the art, and are contemplated to be embraced within the present invention.

What is claimed is:

1. A rupturable sealing unit for use with a supply of pressurized fluid which inflates an inflatable bag when said sealing unit is ruptured, said sealing unit comprising in combination: an outlet port of a pressurized gas generator, said outlet part having a neck portion having a spherical segment formed in the leading end thereof; a rupturable rigid blocking member having a dome shaped configuration having an inner surface and an outer surface thereby enabling said blocking member to bear greater force on said outer surface than on said inner surface; means disposed at said inner surface of said blocking member for rupturing same at a selected time including an impact-responsive explosive charge mounted on said inner surface of said blocking member; means for mounting said blocking member to expose said outer surface thereof to pressurized fluid during use of the sealing unit including a cap member threadably engaged with said leading end of said neck portion mounting said blocking member in closing engagement with said spherical segment, said cap member having a bottom wall having means therein defining a bore which is aligned with said pressurized gas discharge outlet port, said bore communicating with an inflatable confinement, whereby when said blocking member is ruptured by energy caused by explosion of said impact-responsive explosive charge during a collision of a motor vehicle, a pressurized gas in said pressurized gas generator is admitted to said inflatable confinement to actuate the same to its inflated position; explosion energy transmitting means which is charged at said inner surface of said blocking member around said explosive charge; and a hollow retainer for retaining said explosion energy transmitting means at said inner surface of said blocking member, said hollow retainer having an outer periphery releasably fitted in said bore of said cap member.

2. A sealing unit according to claim 1, wherein said means for mounting further includes packing means which is interposed between said spherical segment and said outer surface of said blocking member.

3. A sealing unit according to claim 2, wherein said packing means includes an O-ring which is disposed in an annular recess formed in said spherical segment.

4. A sealing unit according to claim 2, wherein said packing means includes a metal sheet which is dome shaped to match said outer surface of said blocking member and which is brazed to said spherical segment.

5. A sealing unit according to claim 1, wherein said explosion energy transmitting means consists of a rubber.

6. A sealing unit according to claim 1, wherein said blocking member comprises a fragile material.

7. A sealing unit according to claim 6, wherein said fragile material is a resin.

8. A sealing unit according to claim 6, wherein said fragile material is a ceramic.

9. A sealing unit according to claim 1, wherein said explosion energy transmitting means consists of a geled material.

10. A sealing unit according to claim 1, wherein said explosion energy transmitting means consists of a grease.

11. A sealing unit according to claim 1, wherein said explosion energy transmitting means consists of a rubber like material.

* * * * *